United States Patent [19]

Esformes et al.

[11] 4,251,996
[45] Feb. 24, 1981

[54] HEAT RECLAIMING METHOD AND APPARATUS

[75] Inventors: Jack L. Esformes, Syracuse; James S. Styron, North Syracuse; Patrick Fichot, Skaneateles, all of N.Y.

[73] Assignee: Carrier Corporation, Syracuse, N.Y.

[21] Appl. No.: 44,627

[22] Filed: Jun. 1, 1979

[51] Int. Cl.³ .................. F25D 17/02; F25B 7/00; F25B 27/02
[52] U.S. Cl. .................................. 62/79; 62/98; 62/183; 62/238 E; 62/188
[58] Field of Search .............. 62/188, 183, 238 E, 62/89, 98, 181, 79

[56] References Cited

U.S. PATENT DOCUMENTS

| 2,702,671 | 2/1955  | Carter    | 62/181 X |
| 2,703,965 | 3/1955  | Shawhan   | 62/181 X |
| 3,322,188 | 5/1967  | Ostrander | 62/183 X |
| 3,926,008 | 12/1975 | Webber    | 62/238 E |
| 4,134,274 | 1/1979  | Johnsen   | 62/238 E |
| 4,141,222 | 2/1979  | Ritchie   | 62/238 E |

*Primary Examiner*—Lloyd L. King
*Attorney, Agent, or Firm*—J. Raymond Curtin; John S. Sensny

[57] ABSTRACT

Heat reclaiming method and apparatus for use with a vapor compression refrigeration circuit, a heat transfer fluid, and a heat storage facility. The heat reclaiming apparatus comprises a heat reclaiming condenser connected to the refrigeration circuit for receiving refrigerant vapor therefrom and discharging condensed refrigerant thereto, further connected to a source of the heat transfer fluid for receiving fluid therefrom, and still further connected to the heat storage facility for discharging the heat transfer fluid thereto, and wherein refrigerant vapor passes in heat transfer relation with the heat transfer fluid to heat the fluid and condense refrigerant vapor. The heat reclaiming apparatus further comprises a valve for regulating the flow of heat transfer fluid to the heat reclaiming condenser; and a valve control for controlling the valve to decrease the quantity of heat transfer fluid flowing to the heat reclaiming condenser when the condensed refrigerant therein reaches a predetermined level.

10 Claims, 1 Drawing Figure

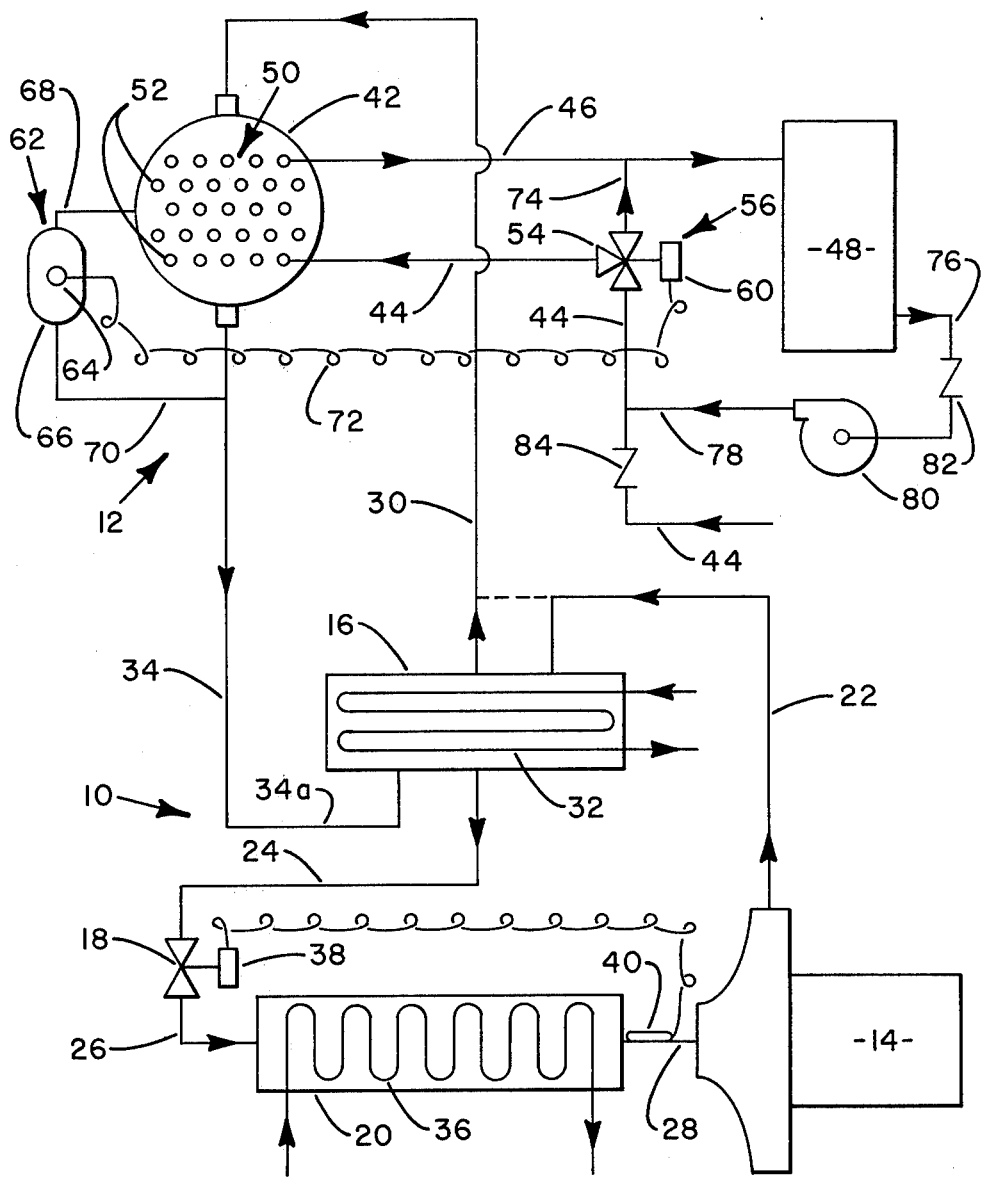

HEAT RECLAIMING METHOD AND APPARATUS

DESCRIPTION

BACKGROUND OF THE INVENTION

The present invention relates generally to a heat reclaiming method and apparatus, and more particularly to a method and apparatus for reclaiming the normally wasted heat rejected by the refrigerant of a refrigeration circuit.

Vapor compression refrigeration systems generally comprise a compressor, a condenser, an expansion device, and an evaporator connected by appropriate refrigerant lines to form a refrigeration circuit. Refrigerant vapor is compressed by the compressor and fed to the condenser where the refrigerant rejects heat to a cooling medium and condenses. The condensed refrigerant then flows through the expansion device, reducing the pressure and temperature of the refrigerant. From the expansion device, the refrigerant passes into the evaporator, absorbs heat from a medium which is thereby cooled, and vaporizes. Vaporous refrigerant is then drawn back into the compressor, completing the circuit.

Refrigeration circuits of the foregoing type are frequently employed to cool a fluid such as water which is circulated through various rooms or areas of a building to, in turn, cool these areas. Often, the refrigerant of such circuits rejects a relatively large amount of heat at the condenser of the circuit. This rejected heat is commonly dissipated to the atmosphere, either directly or via a cooling fluid that circulates between the condenser and a cooling tower. Over a period of time, the rejected heat represents a substantial waste or energy, and recently much attention has been directed to reclaiming or recovering this heat.

One general approach to reclaiming this heat has been to draw off a portion of the refrigerant vapor discharged from the compressor and pass this vapor through a heat reclaiming condenser separate from the condenser of the refrigeration circuit. A heat exchanger comprising a plurality of heat exchange tubes is positioned within the heat reclaiming condenser, and water is circulated through the heat exchanger in heat transfer relation with the vapor in the heat reclaiming condenser. Heat is transferred from the vapor to the water, heating the water and condensing the vapor. The heated water is conducted to a storage tank where the water may be stored for later use, and the condensed refrigerant is returned to the refrigeration circuit for further use therein. Under certain circumstances, condensed refrigerant may accumulate in the heat reclaiming condenser and flood tubes of the heat exchanger located therein. When this happens, water passing through the flooded tubes does not come into direct heat transfer relation with the refrigerant vapor which is much hotter than the liquid, condensed refrigerant. As a result, the amount of heat absorbed by the water is reduced, reducing the amount of heat reclaimed from the refrigeration circuit.

SUMMARY OF THE INVENTION

In light of the above, an object of the present invention is to improve methods and apparatus for reclaiming heat from a vapor compression refrigeration circuit.

Another object of this invention is to provide an inexpensive, reliable, and efficient heat recovery method and apparatus.

A further object of the present invention is to prevent condensed refrigerant from flooding heat exchange tubes of a heat reclaiming condenser.

Still another object of this invention is to vary the amount of heat transfer fluid circulated through a heat reclaiming condenser in response to changes in the amount of condensed refrigerant therein.

These and other objectives are attained with heat reclaiming apparatus for use with a vapor compression refrigeration circuit, a heat transfer fluid, and a heat storage facility. The heat reclaiming apparatus comprises heat reclaiming condenser means connected to the refrigeration circuit for receiving refrigerant vapor therefrom and discharging condensed refrigerant thereto, further connected to a source of the heat transfer fluid for receiving fluid therefrom, and still further connected to the heat storage facility for discharging the heat transfer fluid thereto, and wherein refrigerant vapor passes in heat transfer relation with the heat transfer fluid to heat the fluid and condense refrigerant vapor. The heat reclaiming apparatus further comprises valve means for regulating the flow of the heat transfer fluid to the heat reclaiming condenser means; and control means for controlling the valve means to decrease the quantity of heat transfer fluid flowing to the heat reclaiming condenser means when the condensed refrigerant therein reaches a predetermined level.

BRIEF DESCRIPTION OF THE DRAWING

The sole FIGURE is a schematic representation of a vapor compression refrigeration circuit and a heat reclaiming apparatus for use therewith and incorporating teachings of the present invention.

DESCRIPTION OF THE PREFERRED EMBODIMENT

The sole FIGURE is a schematic illustration showing a vapor compression refrigeration circuit, generally referenced as 10, and heat reclaiming apparatus, generally referenced as 12, for use with circuit 10 and incorporating teachings of the present invention. Refrigeration circuit 10 includes compressor 14, condensor 16, variable expansion means 18 and evaporator 20 connected by refrigeration lines 22, 24, 26, and 28 to form a refrigeration circuit. Compressor 14 discharges hot, compressed refrigerant vapor into line 22, which leads to condenser 16. A portion of the refrigerant vapor passes via line 30 to heat reclaiming apparatus 12, discussed in greater detail below, and the remaining refrigerant vapor passes through condenser 16 and rejects heat to an external heat exchange medium such as water circulating through heat exchange coil 32. As refrigerant passes through condenser 16, the refrigerant is condensed. Also, condensed refrigerant from heat reclaiming circuit 12 is returned to condenser 16 via line 34. From condenser 16, liquid refrigerant proceeds through line 24 and through variable expansion means 18. Expansion means 18 reduces the temperature and pressure of refrigerant passing therethrough. The expanded refrigerant proceeds through line 26 and through evaporator 20 where the refrigerant absorbs heat from an external heat exchange medium such as water passing through heat exchange coil 36. The refrigerant vaporizes as it passes through evaporator 20, and vaporous refrigerant is discharged from the evaporator into line 28 leading back to compressor 14.

The heat exchange medium moving through coil 36 of evaporator 20 may be used for a number of different purposes, for example to cool the rooms of a building (not shown), and then returned to the evaporator. The load on refrigeration circuit 10, represented by the medium passing through coil 36, varies and preferably evaporator 20 cools that medium to a substantially constant final temperature. Any suitable means may be employed to control the operation of evaporator 20 in such a way to meet this objective. In the system depicted in the drawing, the control includes variable expansion means 18 and positioning means 38, which may be of any suitable type such as electric, pneumatic, or hydraulic positioners. Positioning means 38 controls the amount of refrigerant passing through expansion means 18 in response to variations in the load on circuit 10 as represented by changes in the temperature of vapor leaving evaporator 20. This temperature is sensed by sensing means 40 which also may be of any suitable type, for example a thermo-sensitive bulb.

Referring now to heat reclaiming apparatus 12, the apparatus comprises heat reclaiming condenser 42 that is connected to refrigeration circuit 10 via lines 30 and 34 for receiving refrigerant vapor from circuit 10 and discharging condensed refrigerant thereto. In the preferred embodiment depicted in the drawing, heat reclaiming condenser 42 is connected to condenser 16 of circuit 10 by lines 30 and 34 wherein the condensers operate in parallel to condense refrigerant vapor. Alternately, as shown in broken lines in the drawing, line 30 could be directly connected to low pressure line 22. Preferably, condenser 16 is capable of satisfying the entire condensation needs of circuit 10, allowing circuit 10 to operate independently of heat reclaiming apparatus 12. Heat reclaiming condenser 42 is further connected, via line 44, to a source (not shown) of a heat transfer fluid for receiving fluid therefrom; and condenser 42 is still further connected, via line 46, to a heat storage facility 48 for discharging fluid thereto. Many suitable types of heat transfer fluids, sources thereof, and storage facilities therefor are well known to those skilled in the art and may be employed in the practice of the present invention. For example, the heat transfer fluid may be water, the source thereof may be a water tank or a municipal water supply, and the heat storage facility may be a hot water tank.

Heat exchanger 50, comprising a plurality of heat exchange tubes 52, is positioned within heat reclaiming condenser 42. Heat exchanger 50 is connected to fluid lines 44 and 46 wherein heat transfer fluid from the source thereof flows through tubes 52 and therefrom passes to heat storage facility 48. Vaporous refrigerant entering condenser 46 via line 30 passes downward through the condenser, flowing over heat exchange tubes 52 in heat transfer relation with the heat transfer fluid passing therethrough. Heat is transferred from the vapor to the fluid within tubes 52, heating the fluid and condensing the vapor. The heated fluid then passes through line 46 to storage facility 48 where the fluid may be stored for later use. In this manner, heat reclaiming apparatus 12 recovers heat from refrigeration circuit 10 which would otherwise simply be dissipated to the atmosphere via condenser 16.

Refrigerant condensed in heat reclaiming condenser 42 passes back to condenser 16 of circuit 10 via line 34. Preferably, condenser 42 is located above condenser 16 wherein the force of gravity causes liquid refrigerant to flow from the former condenser to the latter condenser via line 34. Moreover, preferably the vapor pressure within heat reclaiming condenser 42 is less than the vapor pressure in condenser 16, causing refrigerant vapor to pass from the latter to the former through line 30 without requiring the assistance of special pumping equipment. Also, as shown in the drawing, line 34 includes lower section 34a which is below condenser 16. With this arrangement, liquid collects in line 34, preventing vapor flow therethrough and helping to maintain the pressure difference between condensers 16 and 42.

The pressure difference between condensers 42 and 16 also causes the level of liquid refrigerant in line 34 to rise above the level of condensed refrigerant in condenser 16. If the pressure difference between condensers 42 and 16 increases, then the liquid refrigerant level in line 34 rises; and, if this pressure difference becomes large enough, liquid refrigerant will begin to accumulate in heat reclaiming condenser 42 and immerse heat exchange tubes 52 in liquid refrigerant. Condensed refrigerant may also accumulate in heat reclaiming condenser 42 if the rate of condensation therein exceeds the rate at which characteristics such as size and shape of line 34 allow liquid to enter and flow therethrough.

If liquid refrigerant accumulates in heat reclaiming condenser 42 and floods heat exchange tubes 52, then the vaporous refrigerant in condenser 42 cannot come into direct contact with the flooded tubes. Since the vaporous refrigerant is much hotter than the condensed refrigerant, preventing direct contact between heat exchange tubes 52 and the vaporous refrigerant reduces the quantity of heat that is transferred to the fluid passing through the heat exchange tubes. This reduces the amount of heat reclaimed from refrigeration circuit 10 by apparatus 12.

To eliminate the above-discussed flooding of heat exchange tubes 52, the heat reclaiming apparatus of the present invention includes valve means 54 and control means 56. Valve means 54, preferably including a three way modulating valve located in line 44, regulates the flow of the heat transfer fluid to heat reclaiming condenser 42, and more particularly heat exchanger 50 therein. Control means 56, preferably including positioning means 60 and sensing means 62, controls valve means 54 in response to the level of condensed refrigerant in heat reclaiming condenser 42. Valve means 54 and control means 56 cooperate to reduce the quantity of heat transfer fluid flowing through line 44 to heat reclaiming condenser 42 when the condensed refrigerant therein reaches a predetermined level.

More specifically, sensing means 62 is in communication with heat reclaiming condenser 42 for sensing the level of condensed refrigerant therein and sending a signal indicative of that level to positioning means 60. As will be appreciated, sensing means 62 may be of any suitable type. For example, sensing means 62 may include floating means 64 disposed within float chamber 66 which is in fluid communication with heat reclaiming condenser 42 and line 34 via pilot lines 68 and 70. With this arrangement, liquid refrigerant will accumulate in float chamber 66 to the same level liquid refrigerant accumulates in condenser 42, and floating means 64 is arranged to produce a signal such as an electric or pneumatic signal responsive to the level of condensed refrigerant in chamber 66.

The signal produced by sensing means 62 is applied to positioning means 60 via line 72 therebetween. Positioning means 60, which also may be of any appropriate type such as an electric, hydraulic, or pneumatic positioner, controls modulating valve 54 in response to the magnitude of the signal applied to the positioning means. In this manner, sensing means 62, positioning means 60, and valve means 54 cooperate to gradually, inversely vary the flow of the heat transfer fluid passing through heat exchanger 52 in response to changes in the level of liquid condensed refrigerant in condenser 42.

As the quantity of heat transfer fluid flowing through heat exchanger 50 decreases, the velocity of the fluid flow therethrough also decreases. The heat transfer fluid spends a greater amount of time in heat exchanger 50, and this causes the temperature of the fluid as it flows therethrough to rise a greater amount than before the fluid flow was restricted. With this greater temperature rise, the cooling effect that the heat transfer fluid has on refrigerant vapor in condenser 42 is diminished, allowing the temperature of the vapor to increase. As the temperature of the vapor increases, the pressure thereof also increases. Increasing the pressure in condenser 42 lowers the level of condensed refrigerant therein.

Preferably, valve means 54 and control means 56 begin to restrict the flow of the heat transfer fluid through heat exchanger 50 before the condensed refrigerant in condenser 42 begins to cover tubes 52 to maintain the level of condensed refrigerant therebelow. If tubes 52 do become immersed in liquid refrigerant, lowering the liquid level may expose more tubes to the refrigerant vapor, increasing the rate of refrigerant condensation in condenser 42. The heat of condensation developed in condenser 42 increases, and this added heat further raises the temperatures of the heat transfer fluid flowing through heat exchanger 50 and the vapor in condenser 42. This, of course, further raises the pressure of the vapor, further lowering the liquid level in condenser 42. As the temperatures of the heat transfer fluid and vapor increase, it becomes more difficult to further raise these temperatures. Eventually, an equilibrium condition is reached wherein the heat of condensation developed in heat reclaiming condenser 42 is sufficient to maintain the equilibrium temperatures of the heat transfer fluid and refrigerant vapor and the equilibrium pressure of the latter, but is insufficient to further raise these values.

Preferably, as mentioned above, valve means 54 and control means 56 begin to restrict the flow of the heat transfer fluid before liquid refrigerant in condenser 42 rises to the level of tubes 52. Further, with the preferred arrangement of modulating valve 54, sensing means 62 and positioning means 60, the flow of the heat transfer fluid is further restricted proportionately in response to further increases in the level of condensed refrigerant in heat reclaiming condenser 42. Such an arrangement works to produce an equilibrium state where the level of liquid refrigerant in condenser 42 is below tubes 52, providing maximum or near maximum heat recovery from refrigeration circuit 10 by heat reclaiming apparatus 12. Maintaining a lower level of condensed refrigerant in condenser 42 also helps to maintain an adequate supply of liquid refrigerant in evaporator 20 of circuit 10, ensuring efficient operation thereof.

As mentioned above, heat recovered from refrigeration circuit 10 by reclaiming apparatus 12 is transferred to heat storage facility 48 via line 46. Heat storage facility 48 may be utilized to satisfy demands of, for example, a commercial or residential building. Preferably, a supplementary heat source (not shown) such as an oil or gas fired burner is disposed within facility 48 to supplement the heat transferred thereto via reclaiming apparatus 12, ensuring that the heat storage facility satisfies the demands placed thereon regardless of fluctuations in the amount of heat reclaimed from circuit 10 by apparatus 12.

Further, preferably heat reclaiming apparatus 12 includes bypass means, including bypass line 74, for conducting heat transfer fluid from the source thereof to heat storage facility 48 to bypass heat reclaiming condenser 42, and valve means 54 diverts heat transfer fluid from line 44 to the bypass means as valve means 54 regulates the flow of the heat transfer fluid through line 44. In this manner, the heat transfer fluid can be employed to, for example, cool or limit the temperature of the fluid entering or stored in storage facility 48. The bypass means also permits valve 54 to regulate fluid flow through line 44 and to heat exchanger 50 without increasing the pressure of the fluid in line 44 upstream of valve 54.

Moreover, preferably recirculating means, including lines 76 and 78 and pump 80, is provided for selectively conducting heat transfer fluid from heat storage facility 48 and back to heat reclaiming condenser 42 for reheating the heat transfer fluid and further raising the temperature thereof when this is desirable. More specifically, to recirculate heat transfer fluid, pump 80 is operated to draw fluid from storage facility 48 via line 76 and discharge the fluid into line 44 via line 78. The fluid then flows through line 44, valve 54, and heat exchanger 50. The heat transfer fluid returns to storage facility 48 via line 46, completing a closed loop fluid circuit. Check valve 82 is located in line 76 to prevent fluid flow therethrough when pump 80 is inoperative, and check valve 84 is positioned in line 44 to prevent fluid from escaping from the above-described closed loop fluid circuit via line 44.

While it is apparent that the invention herein disclosed is well calculated to fulfill the objects above stated, it will be appreciated that numerous modifications and embodiments may be devised by those skilled in the art, and it is intended that the appended claims cover all such modifications and embodiments as fall within the true spirit and scope of the present invention.

I claim:

1. A method of reclaiming heat from a vapor compression refrigeration circuit comprising the steps of:
    passing a heat transfer fluid in heat transfer relation with refrigerant vapor from the refrigeration circuit to transfer heat to the fluid and condense the vapor;
    collecting refrigerant condensed by the heat transfer fluid;
    returning condensed refrigerant to the refrigeration circuit;
    sensing the level of collected condensed refrigerant; and
    inversely modulating the amount of heat transfer fluid passing in heat transfer relation with refrigerant vapor in response to changes of the level of the collected condensed refrigerant.

2. The heat reclaiming method as defined by claim 1 wherein the returning step includes the step of employing the force of gravity to return condensed refrigerant to the refrigeration circuit.

3. The heat reclaiming method as defined by claim 2 wherein the modulating step includes the step of diverting heat transfer fluid away from heat transfer relation with the refrigerant vapor when the collected, condensed refrigerant reaches a predetermined level.

4. The heat reclaiming method as defined by claim 3 further including the step of recirculating heat transfer fluid into heat transfer relation with refrigerant vapor to reheat the heat transfer fluid.

5. Heat reclaiming apparatus for use with a vapor compression refrigeration circuit, a heat transfer fluid, and a heat storage facility, the heat reclaiming apparatus comprising:

heat reclaiming condenser means connected to the refrigeration circuit for receiving refrigerant vapor therefrom and discharging condensed refrigerant thereto, further connected to a source of the heat transfer fluid for receiving fluid therefrom, and still further connected to the heat storage facility for discharging the heat transfer fluid thereto, and wherein refrigerant vapors pass in heat transfer relation with the heat transfer fluid to heat the fluid and condense refrigerant vapor;

valve means for regulating the flow of the heat transfer fluid to the heat reclaiming condenser means;

sensing means for sensing the level of condensed refrigerant in the heat reclaiming condenser means; and positioning means for controlling the valve means to inversely vary the quantity of heat transfer fluid flowing to the heat reclaiming condenser means in response to changes in the level of condensed refrigerant therein.

6. The heat reclaiming apparatus as defined by claim 5, wherein:

the valve means includes a modulating valve; and the positioning means positions the modulating valve in response to the level of condensed refrigerant in the heat reclaiming condenser means.

7. The heat reclaiming apparatus as defined by claim 6 wherein the heat reclaiming condenser means is located in parallel with a condenser of the refrigeration circuit.

8. The heat reclaiming apparatus as defined by claim 3 wherein the heat reclaiming condenser means is positioned above the condenser of the refrigeration circuit wherein condensed refrigerant flows thereto by gravity from the heat reclaiming condenser means.

9. The heat reclaiming apparatus as defined by claim 8 further including:

bypass means for conducting heat transfer fluid from the source thereof to the heat storage facility to bypass the heat reclaiming condenser means; and wherein:

the valve means diverts heat transfer fluid through the bypass means when the condensed refrigerant in the condenser means reaches a predetermined level.

10. The heat reclaiming apparatus as defined by claim 9 further including recirculating means for conducting heat transfer fluid from the heat storage facility and to the heat reclaiming condenser means to reheat the heat transfer fluid.

* * * * *